(12) United States Patent
Sonzogni

(10) Patent No.: US 10,926,370 B2
(45) Date of Patent: Feb. 23, 2021

(54) PROCESS FOR MACHINING A LENS

(71) Applicant: MEI S.r.l., Valbrembo (IT)

(72) Inventor: Stefano Sonzogni, Valbrembo (IT)

(73) Assignee: MEI S.r.l., Valbrembo (IT)

(*) Notice: Subject to any disclaimer, the term of this patent is extended or adjusted under 35 U.S.C. 154(b) by 344 days.

(21) Appl. No.: 15/027,833

(22) PCT Filed: Oct. 15, 2014

(86) PCT No.: PCT/EP2014/072075
§ 371 (c)(1),
(2) Date: Apr. 7, 2016

(87) PCT Pub. No.: WO2015/059007
PCT Pub. Date: Apr. 30, 2015

(65) Prior Publication Data
US 2016/0243667 A1   Aug. 25, 2016

(30) Foreign Application Priority Data
Oct. 22, 2013   (IT) .................. MI2013A0001758

(51) Int. Cl.
*B24B 13/005* (2006.01)
*B24B 9/14* (2006.01)
*B29D 11/00* (2006.01)

(52) U.S. Cl.
CPC ............ *B24B 13/005* (2013.01); *B24B 9/146* (2013.01); *B29D 11/00932* (2013.01)

(58) Field of Classification Search
CPC ..... B24B 13/005; B24B 13/012; B24B 9/146; B24B 11/005; B29D 11/00932

USPC ............................. 451/42, 43, 388, 390, 495
See application file for complete search history.

(56) References Cited

U.S. PATENT DOCUMENTS

| 5,149,337 A | * | 9/1992 | Watanabe ................. B24B 9/14 451/255 |
| 5,210,695 A | * | 5/1993 | Wood .................... B24B 13/005 451/5 |
| 5,454,748 A | | 10/1995 | Gottschald |

(Continued)

FOREIGN PATENT DOCUMENTS

| CN | 103302568 A | 9/2013 | |
| GB | 583202 A | * 12/1946 | ........... B24B 13/005 |

(Continued)

OTHER PUBLICATIONS

Written Opinion issued for corresponding Singapore patent application No. 11201602795, dated Apr. 11, 2017, 5 pages.

(Continued)

*Primary Examiner* — Monica S Carter
*Assistant Examiner* — Marcel T Dion
(74) *Attorney, Agent, or Firm* — Duane Morris LLP

(57) ABSTRACT

A process for machining a lens includes the steps of holding a semi-finished product through a suction holding force which is active during an entire surface machining cycle of the semi-finished product; carrying out the surface machining cycle on a surface to be machined of the semi-finished product; and activating a pressure holding force depending on the level of the mechanical stresses exerted on the semi-finished product during the surface machining cycle on said surface.

8 Claims, 3 Drawing Sheets

(56) References Cited

U.S. PATENT DOCUMENTS

| | | | | |
|---|---|---|---|---|
| 5,567,198 | A | * | 10/1996 | Cook .................... B24B 13/005 269/266 |
| 5,720,649 | A | * | 2/1998 | Gerber .................... B24B 13/06 451/41 |
| 6,110,016 | A | * | 8/2000 | Coleman ................. B24B 9/146 451/390 |
| 6,379,215 | B1 | * | 4/2002 | Mizuno .................... B24B 9/14 451/255 |
| 6,419,570 | B1 | * | 7/2002 | Werner ................... B24B 9/146 451/384 |
| 6,848,969 | B2 | * | 2/2005 | Luderich ................. B24B 9/148 451/10 |
| 9,421,720 | B2 | | 8/2016 | Shibata et al. |
| 2002/0031993 | A1 | | 3/2002 | Jung et al. |
| 2008/0132157 | A1 | * | 6/2008 | Schneider ............... B24B 9/146 451/390 |
| 2008/0299881 | A1 | | 12/2008 | Herbin et al. |
| 2011/0037945 | A1 | | 2/2011 | Wiand |
| 2011/0256806 | A1 | * | 10/2011 | Monnoyeur ........ B24B 13/0031 451/10 |

FOREIGN PATENT DOCUMENTS

| | | |
|---|---|---|
| JP | 03-121763 A | 5/1991 |
| JP | 04-008402 A | 1/1992 |
| JP | 06-071547 A | 3/1994 |
| JP | 2003-39203 A | 2/2003 |
| JP | 2010-137352 A | 6/2010 |
| WO | 9843778 A1 | 10/1998 |

OTHER PUBLICATIONS

European Patent Office, Written Opinion and International Search Report issued in corresponding International Application No. PCT/EP2014/072075, dated Dec. 15, 2014, pp. 1-7.

Office Action issued for corresponding Chinese patent application No. 201480058494.7, dated Mar. 31, 2017, 15 pages.

Kubota, S., Office Action dated Aug. 21, 2018 in Japanese Patent Application No. 2016-526118, including English translation. Japan Patent Office,1-10.

Tsai, T.Q.T & Lee, V.S.C. Patent Office Action dated Jun. 5, 2018 in Taiwan Patent Application No. 103136173, including English translation.Taiwan Patent Office,1-12.

* cited by examiner

PROCESS FOR MACHINING A LENS

BACKGROUND AND SUMMARY OF THE INVENTION

The present invention relates to a process for machining a lens, in particular, but not for limiting purposes, for surface cutting a blank for generating a lens.

A lens is made up of a light-permeable layer, which may or may not be tinted, ending at the two front and rear end faces with two perfectly polished optical surfaces. Such surfaces can have any shape, variable from perfectly spherical to more complex configurations, depending on the particular optical result that it is wished to be obtained.

In the machining of lenses, in addition to the precision in manufacturing the single surfaces, it is also essential for such surfaces to be perfectly aligned with one another both axially and angularly. Otherwise, the lens is unable to provide the optical effect for which it was designed.

The apparatuses for manufacturing lenses are able to obtain a lens with specific predefined optics from a block of raw or semi-finished material, i.e. finished in just the front or convex face, also called semi-finished product.

Depending on the particular machining and the result that is wished to be obtained, such apparatuses initially carry out a cutting step, for example through milling or turning of the optical surface, following a pre-calculated three-dimensional profile. Thereafter, the polishing and coating steps of the machined surface take place.

In order to be able to carry out the machining of a second surface it is necessary to firmly hold the semi-finished product in a precise position, so that it is possible to ensure the perfect alignment between the two surfaces.

In the state of the art, in order to hold in position the semi-finished product a reference block is used that has been applied in advance to the already-finished surface—in general the front surface—at a precise angular and axial position.

Such a reference block acts as a gripping interface for the holding system during the cutting step of the second surface and further provides the semi-finished product with a sufficient strength to counteract the stresses exerted by the cutting operation. Moreover, thanks to the reference point consisting of the block, it is possible to obtain the desired precision of machining.

Whilst offering the described advantages, the use of a reference block as gripping interface of the holding system results in some drawbacks.

The step of applying the block on the surface that has already been machined generally takes place through the use of resins or glues, therefore requiring long times to allow the adhesive material to set and cool down. Alternatively, the block is applied through a lead-based low melting alloy.

Similarly, the step of removing the block from the lens, when machining has ended, takes a substantial amount of technical time as well. Therefore, there is an overall extension of the duration of the machining process.

Moreover, the use of adhesive materials or lead causes the production of waste material as well as possible health problems for the workers involved on a daily basis with the machining of lenses due to the probable toxicity of the adhesive material and of the lead itself.

The Applicant has therefore perceived the importance of devising a process for machining a semi-finished product that does not require the use of a reference block to be applied to the already-finished surface.

Solutions are already known that have tried to eliminate the use of such a block, like for example the method described in document WO 98/43778. Such a method foresees that the semi-finished product is held through a vacuum-generation system applied to the already-finished or front surface during the entire machining step of the opposite surface. It is also foreseen to machine the perimeter surface of the semi-finished product. During the machining of the perimeter surface the holding system makes exclusive use of a pressure system, deactivating the suction system beforehand.

U.S. Pat. No. 5,454,748 describes a process for machining a face and the perimeter surface of a lens.

According to the Applicant the use of a suction system during the machining of the rear surface, i.e. the opposite one to the front surface, does not however seem to be able to reliably counteract the mechanical stresses to which the semi-finished product is subjected during the entire machining cycle of such a rear surface. In general, the semi-finished product is subjected to tangential stresses that tend to rotate it, taking it out of alignment, and/or radial stresses that tend to move it laterally.

The Applicant has observed that the mechanical stresses to which the semi-finished product is subjected during the surface machining of the rear surface are variable depending on the specific machining step—rough cutting or machining, finishing and polishing cutting—as well as the work position of the particular tool.

In particular, the Applicant has found that the mechanical stresses are greater in the rough cutting step, with respect to the finishing and polishing steps. More specifically, in the rough cutting step the stresses are greater when the cutting tool acts close to the edge of the rear surface of the semi-finished product and smaller when such a tool exerts its action close to the centre of the rear surface of the semi-finished product.

The Applicant has also found that the mechanical stresses also vary depending on the amount of material that is removed over time to generate the rear surface.

The Applicant has therefore noted that, in order to remove large quantities of material in a short time, the action of a suction force alone for holding in position the semi-finished product during the surface machining step of the rear surface may not be sufficient to ensure that it is kept in position, during the entire machining cycle.

In particular, in the case of high stresses, for example when, in the rough cutting step, the tool acts close to the edge of the rear surface of the semi-finished product, there may even be detachment of such an edge from the suction system.

The problem at the basis of the invention is therefore that of avoiding the aforementioned drawbacks, in particular by devising a process for machining a lens that is able to ensure both precision of positioning, and reliability of holding of the semi-finished product during the entire machining cycle, without the use of a reference block.

Therefore, the present invention relates to a process for machining a lens according to claim 1. Preferred characteristics of the process for machining a lens are given in the dependent claims.

More specifically, the invention relates to a process for machining a lens, comprising the steps of
holding a semi-finished product through a suction holding force which is active during an entire surface machining cycle of the semi-finished product;
carrying out the surface machining cycle on a surface to be machined of the semi-finished product; and activating a pressure holding force depending on the level of the mechanical stresses exerted on the semi-finished product during the surface machining cycle on said surface.

Thanks to the selective use of a pressure holding force in addition to a suction force, it is possible to carry out the machining of the surface to be treated without the need for a reference block.

The process for machining a lens according to the invention indeed ensures reliable holding of the semi-finished product during the entire surface machining cycle.

This embodiment of the process for machining a lens can be further improved through the following additional details that can be combined as desired.

Preferably, the pressure holding force is activated depending on the instantaneous relative position taken up by a machine tool in the surface machining cycle with respect to the surface to be machined. Given that the mechanical stresses vary depending on the instantaneous position of the aforementioned tool, by activating and deactivating the pressure holding force depending on the instantaneous surface machining position it becomes possible to counteract high mechanical stresses and at the same time ensure full access to the surface to be treated.

More preferably, the pressure holding force is kept active when the machine tool is close to the outer edge of the surface to be machined.

In such a position, indeed, the mechanical stresses are higher, requiring a combined suction and pressure action according to the invention in order to ensure reliable holding of the semi-finished product also in the absence of reference blocks.

In preferred embodiments of the invention, the pressure holding force is not active when the machine tool is close to a central portion of the surface to be machined.

In such a position, indeed, the mechanical stresses are lower, making it possible to hold the semi-finished product securely even through the action of just the suction force. It is thus possible to obtain free access to the surface to be treated without hindering its machining.

Preferably, the central portion of the surface to be machined has a radial extension equal to about 5%-10% of the radius of the blank.

Preferably, the surface machining cycle comprises a first step in which the semi-finished product is held both by the application of the suction holding force and by the application of the pressure holding force, and a subsequent step in which the semi-finished product is held by the application of the suction holding force alone.

In particular, for the generation of a lens, it is advantageous to implement a first step in which the holding forces act simultaneously, counteracting the high stresses to which the relative semi-finished product is subjected to in the first surface machining step that takes place near to the edge, and a subsequent step in which just the suction force is active, making the remaining surface portion of the semi-finished product accessible to the machine tool.

Preferably, the suction holding force acts on a first surface of the semi-finished product that is opposite with respect to the surface to be machined.

In this way, the suction holding action is not a hindrance to the machining of the surface to be treated.

Preferably, the pressure holding force acts on a second surface of the semi-finished product.

Such a second surface of the semi-finished product is preferably the surface to be machined. In this way, the pressure holding force is particularly effective, adding its own effects to those of the suction force that acts in the same direction.

Alternatively, the second surface of the semi-finished product is a perimeter surface of the semi-finished product. In this case, the application of the pressure holding force does not in any way hinder the access of the tool to the surface to be machined.

In the preferred embodiment of the invention, the step of holding by suction comprises activating a suction group when the first front surface of the semi-finished product rests against a suction chamber arranged in a first rotary shaft.

Such an embodiment is particularly advantageous since it foresees that suitable suction means are implemented directly inside the support of the lens in the form of a rotary shaft, leading to a substantial saving in bulk.

Preferably, the step of activating the pressure holding force comprises bringing a second rotary shaft, parallel to the first rotary shaft, into an operative position thereof in contact with the surface to be machined of the semi-finished product and exerting a pressure on such a surface to be machined.

According to this advantageous implementation, suitable pressure holding means are foreseen which are made in the form of a second rotary shaft that acts by going directly into contact with the surface to be machined, therefore exerting a force in the same direction as the suction force.

In specific embodiments of the present invention, before the step of holding through a suction holding force on there is the step of adapting a deformable support element to the shape of the first surface of the semi-finished product.

An optimal support surface is thus made for the front surface of the semi-finished product, the shape of which perfectly matches the shape of the first surface. An even distribution of the mechanical stresses in the semi-finished product is also achieved during the entire machining cycle.

The step of adapting the deformable support element preferably comprises resting the first surface of the semi-finished product against the support element in order to give such a support element a shape matching the shape of the first surface; and locking in position the support element in such a matching shape.

In this way, the support element is able to keep the shape initially set, matching that of the first surface, providing a counter-thrust evenly distributed over the entire surface.

BRIEF DESCRIPTION OF THE DRAWINGS

Further characteristics and advantages of the present invention will become clearer from the following detailed description of some preferred embodiments thereof, made with reference to the attached drawings. The different characteristics in the single configurations can be combined as desired according to the previous description, if it should be necessary to benefit from the advantages resulting specifically from a particular combination.

In such drawings.

DETAILED DESCRIPTION

Figure 1:
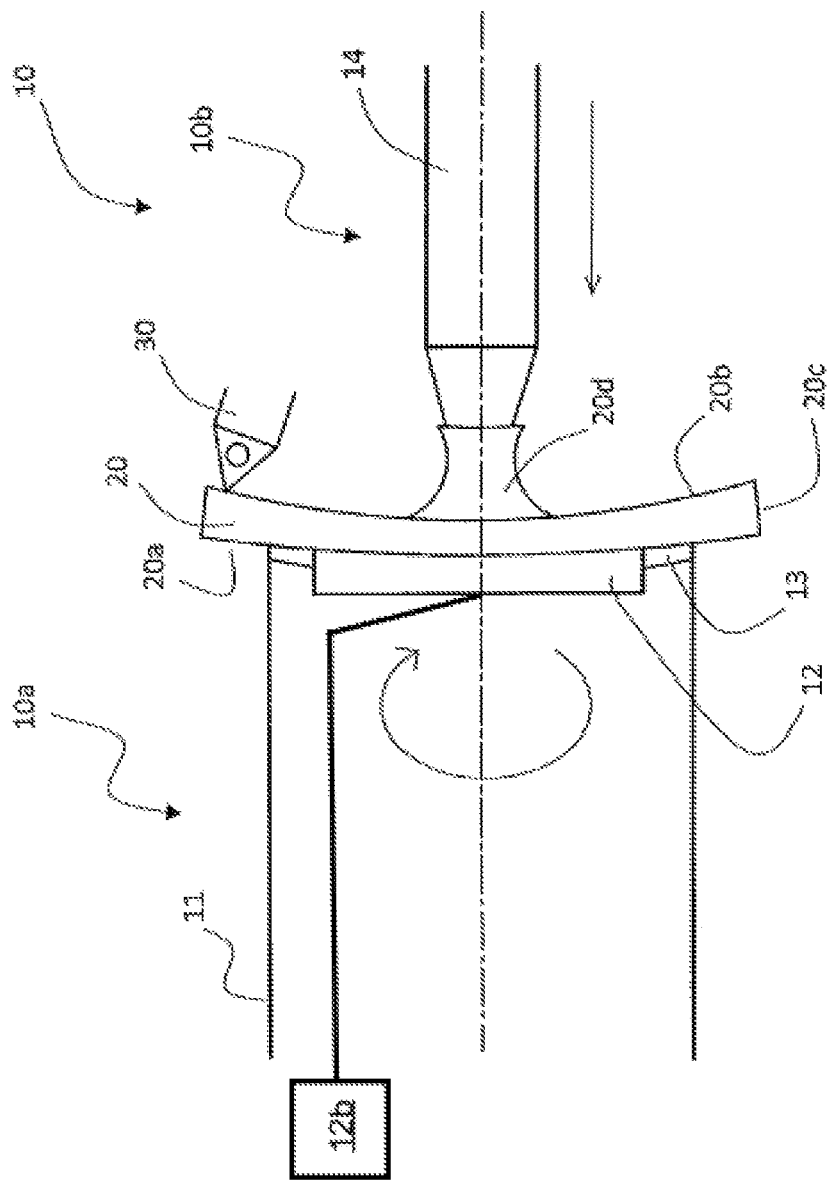
FIG. 1 is a schematic view of a first operative configuration of a first embodiment of a holding group of a semi-finished product for implementing the process for machining a lens according to the present invention.

In the following description, in order to illustrate the figures identical reference numerals will be used to indicate constructive elements with the same function.

With reference to the figures, a holding group of a semi-finished product for implementing the process for machining a lens according to the present invention is shown and it is wholly indicated with 10.

Going into the detail of the example embodiment illustrated, the semi-finished product 20 is a block of semi-finished material intended to become a lens.

Such a semi-finished product 20 comprises a first surface 20a that is already machined, called front or convex surface, and at least one second surface, like for example the rear surface 20b, opposite the front surface 20a, and/or a perimeter side surface 20c.

The rear surface 20b is generally intended to be surface machined.

The holding group 10 comprises a suction holding device 10a. Such a device preferably comprises a first rotary shaft or rear mandrel 11 ending with a suction chamber 12 at the end intended to come into contact with the front surface 20a.

The suction chamber 12 is connected to a suction unit 12b for generating the vacuum and comprises a gasket 13 or other type of sealing elements capable of making a fluid tight coupling once such sealing elements are rested onto the front surface 20a.

The holding group 10 also comprises a pressure holding device 10b. Such a device preferably comprises a second rotary shaft or front mandrel 14, arranged parallel to the first rotary shaft 11, suitable for exerting a pressure on the rear surface 20b.

Figure 2:
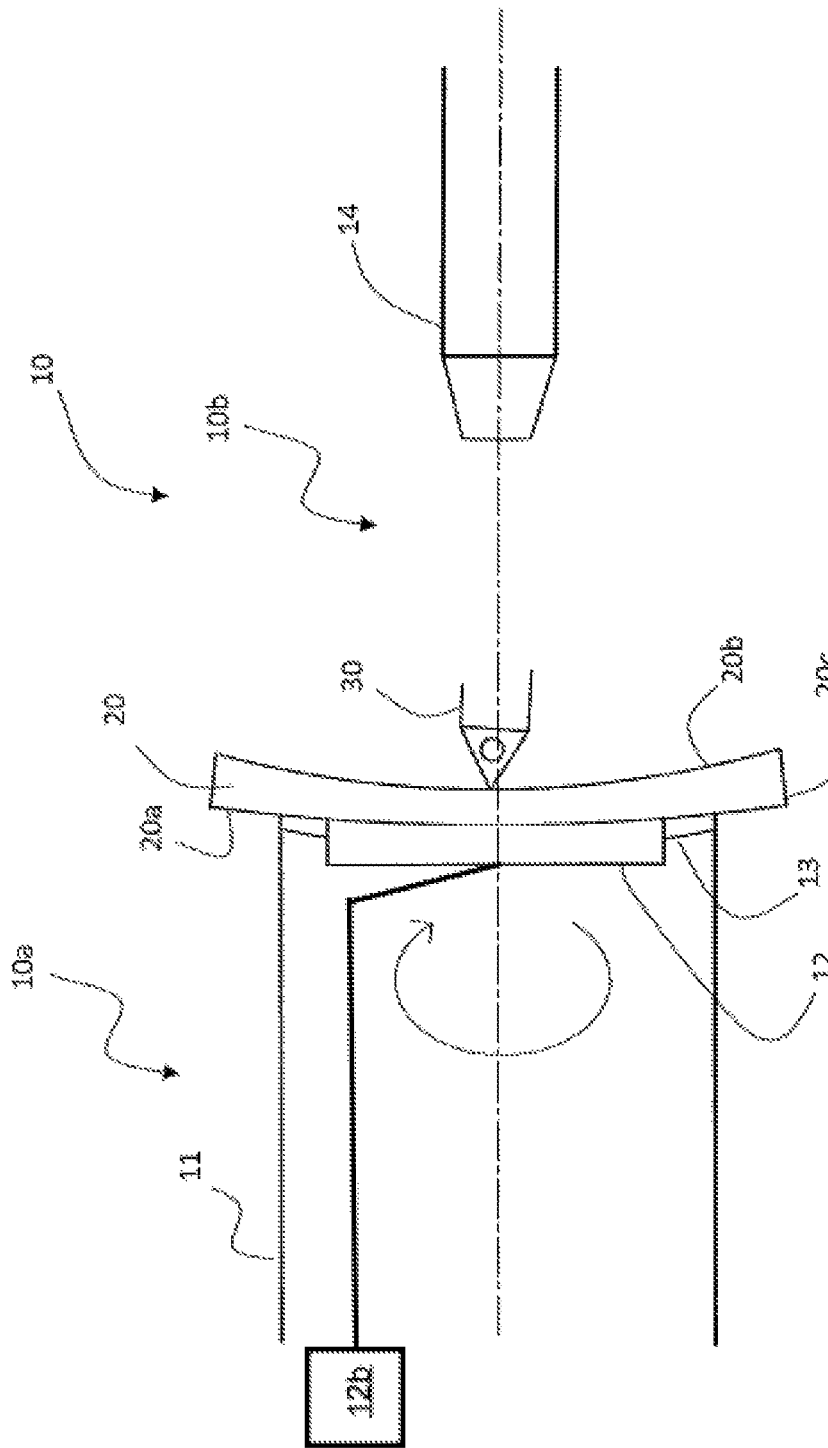
FIG. 2 is a schematic view of the holding group of FIG. 1 in a second operative configuration.

The second rotary shaft 14 is mobile between a first operative position, illustrated in FIG. 1, in which it is in contact with the rear surface 20b, thus being able to exert a pressure directly on such a surface 20b, and a second operative position, illustrated in FIG. 2, in which it is distant from the rear surface 20b, therefore leaving free access to a machine tool of the surface 20b, for example a cutting tool 30 such as a turning plate or a milling cutter. The figures show a turning plate, purely as an example.

In FIG. 1, the second rotary shaft 14 is illustrated resting against an appendage 20d of the semi-finished product 20 remaining at the end of a first perimeter rough machining step carried out by the cutting tool 30.

The movement of the rotary shaft 14 between the first and the second operative position and the pressure exerted on the surface to be machined 20b are controlled through an actuator (not illustrated), for example of the pneumatic or hydraulic type.

In alternative embodiments that are not illustrated, the pressure holding device is such as to exert a radial pressure on the perimeter surface 20c of the semi-finished product 20, therefore comprising elements that are mobile between a first operative position in which they are in contact with such a perimeter surface 20c and exert a radial pressure on it, and a second operative position in which such elements are not in contact with the perimeter surface 20c.

Figure 3:
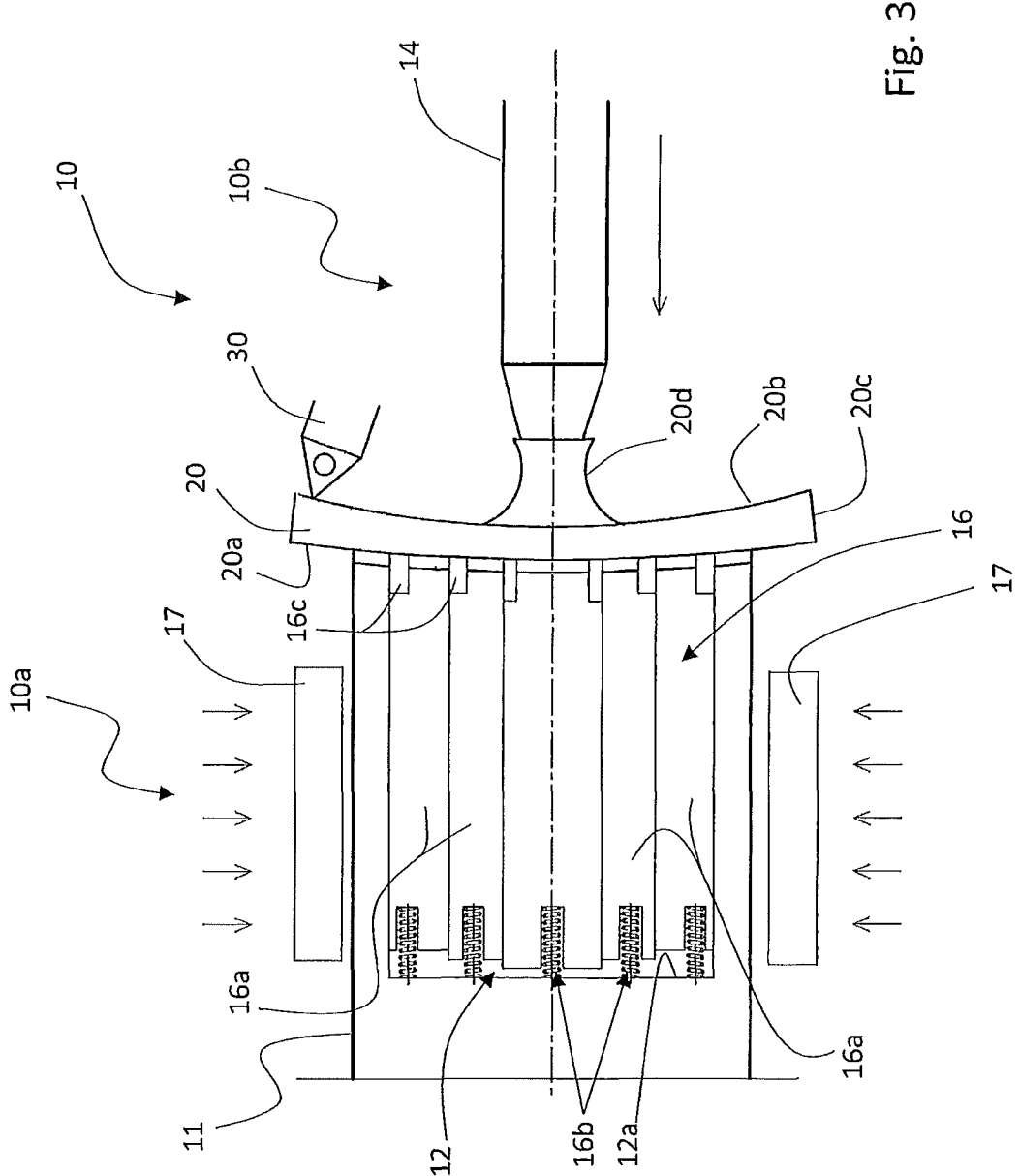
FIG. 3 is a schematic view of a second embodiment of the holding group of a semi-finished product for implementing the process for machining a lens according to the present invention.

According to a preferred, but not limiting, embodiment illustrated in FIG. 3, the holding group 10 also comprises a deformable support element 16, preferably of the self-locking type, made in the suction chamber 12.

Advantageously, the deformable support element 16 comprises a plurality of concentric rings 16a that rest against the base 12a of the suction chamber 12 through interposition of elastic means 16b, like for example a plurality of springs.

The concentric rings 16a terminate, at their free end adapted to rest against the lens 20, with circular gaskets 16c. For the sake of clarity of illustration, reference numerals 16a and 16b are associated in FIG. 3 with just a few of the aforementioned concentric rings and elastic means.

Thanks to the structure described above the support element 16 is able to adapt its shape so as to make a support surface of the front surface 20a of the semi-finished product 20, the shape of which perfectly matches the shape of the front surface 20a.

In particular, when initially the semi-finished product 20 is loaded onto the holding group 10, it still has a thickness and therefore a strength that is sufficient to counteract the action of the elastic means 16b without the force of such elastic means 16b resulting in the breaking of the semi-finished product 20.

By resting the front surface 20a of the semi-finished product 20 against the free ends of the concentric rings 16a, they take up an axial position determined by the particular shape of such a front surface 20a.

Once the shape matching the front surface 20a has been reached, the plurality of concentric rings 16a is locked in position through the action of a locking device 17, for example of the mechanical or hydraulic type.

In this way the support element 16 is able to keep the shape initially set even once the thickness of the lens has undergone a substantial reduction, also providing a counter-thrust evenly distributed over the entire front surface 20a.

Alternative embodiments foresee the use of deformable support elements 16 of the fluid or semifluid type as an alternative to the spring support element.

The process for machining a lens according to the invention will be described hereafter with reference, as a non-limiting example, to a process for generating lenses. Such a process for machining a lens comprises the following steps.

Once a semi-finished product 20 intended to become a lens is loaded onto the holding group 10, the suction holding device 10a is activated, keeping it operative during the entire machining cycle. In this way, the semi-finished product 20 is held through a suction holding force during the entire machining cycle.

Thereafter, the machining cycle is started, which in the specific case of generating lenses comprises firstly the rough machining or rough surface cutting of the surface to be machined 20b of the semi-finished product 20, starting from a machining close to the edge, to then pass to the machining of the central portion of such a surface 20b.

During the rough machining step close to the edge of the surface to be machined 20b, in addition to the suction holding device 10a, the pressure holding device 10b is also activated.

In the specifics of the illustrated embodiment, the suction unit of the holding device 10a is activated when the front surface 20a of the semi-finished product 20 rests against the suction chamber 12 arranged in the first rotary shaft 11.

Thereafter, the actuator of the pressure holding device 10b is activated so as to bring the second rotary shaft 14 into its operative position in contact with the surface to be treated 20b of the semi-finished product 20, placing it in a condition to exert a pressure on such a surface to be machined 20b.

It is therefore possible to carry out the rough machining operations of the surface to be machined 20b close to the edge of the semi-finished product 20 since the combined suction holding and pressure holding action also allows the higher mechanical stresses to which the lens is subjected during such operations to be counteracted as well.

Once the rough machining operations of the surface to be machined 20b close to the edge of the semi-finished product 20 have ended, the pressure holding device 10b is deactivated so as to give free access to the central part of the surface to be machined 20b.

Once the second rotary shaft 14 has been brought into its operative position distant from the surface to be machined 20b, the advancing speeds of the semi-finished product 20 can in fact be kept high, therefore involving a minimal loss in terms of cycle time.

Indeed, advantageously, the cutting tool 30 now operates close to the centre of the semi-finished product 20, involving low cutting forces that can be counteracted with just the vacuum holding force.

It is thus possible to end the rough cutting operations close to the centre of the semi-finished product 20.

In such a configuration it is also possible to proceed to the finishing and polishing cutting steps of the surface 20b through the relative tools. Such operations indeed also generate low stresses that can be counteracted through just the action of the suction holding device 10a.

In the preferred embodiment illustrated in FIG. 3, before the step of activating the suction holding device 10a there is a step of adapting the deformable support element 16 to the shape of the front surface 20a of the semi-finished product 20.

Such a step comprises resting the front surface 20a of the semi-finished product 20 against the support element 16 in order to give the support element a configuration adapted to and matching the shape of the front surface 20a and locking in position of the support element 16 in such a configuration.

From the description that has been made the characteristics of the process for machining a lens of the present invention are clear, just as the relative advantages are also clear.

In particular, the process for machining a lens according to the invention is perfectly able to ensure both precision of positioning, and reliability of holding of the semi-finished product during the entire machining cycle, this moreover in the absence of a reference block, in this way avoiding all of the drawbacks deriving from the use of such a block.

Further variants of the embodiments described above are possible, without departing from the teaching of the invention.

In particular, the description refers as a non-limiting example to a process for generating lenses. However, the process according to the present invention can be actuated in any application for machining lenses where it is necessary to effectively hold a semi-finished product in order to be able to simultaneously proceed to machine it.

Moreover, the sequence of the activation steps of the suction holding force and of the pressure holding force is not restricted to that described purely as an example. Differently, the inventive concept also extends to machining processes that foresee a first machining step with low stresses in which just the suction holding force operates and a second machining step with high stresses in which the pressure holding force also additionally operates or to any combination of such steps.

Finally, it is clear that the process for machining a lens thus conceived can undergo numerous modifications and variants, all of which are covered by the invention; moreover, all of the details can be replaced with technically equivalent elements. In practice, the materials used, as well as the sizes, can be whatever according to the technical requirements.

What is claimed is:

1. A process for machining a lens, the process comprising the steps of:

holding a semi-finished product through a suction holding force which is active during an entire surface machining cycle of the semi-finished product, wherein said semi-finished product comprises a convex front surface, a concave rear surface to be machined opposite to the front surface and a perimeter surface, wherein the suction holding force acts on the front surface;

carrying out the surface machining cycle only on said rear surface to be machined of the semi-finished product by a machine tool; and activating a pressure holding force depending on a magnitude of mechanical stresses exerted on the rear surface of the semi-finished product during the surface machining cycle on said rear surface, the pressure holding force acting on said rear surface, wherein the surface machining cycle on said rear surface comprises a first step in which the semi-finished product is held by the application of both the suction holding force on said front surface and the pressure holding force on said rear surface and the machine tool machines the rear surface of the semi-finished product moving from the outer edge of the rear surface towards the central portion of the rear surface, and a subsequent step in which the semi-finished product is held by application of just the suction holding force on said front surface and the machine tool has reached the central portion of the rear surface.

2. The process for machining a lens according to claim 1, wherein the pressure holding force is activated depending on an instantaneous position taken up by the machine tool on the rear surface in the surface machining cycle.

3. The process for machining a lens according to claim 2, wherein the pressure holding force is kept active when the machine tool is close to the outer edge of the rear surface to be machined.

4. The process for machining a lens according to claim 2, wherein the pressure holding force is not active when the machine tool is close to a central portion of the rear surface to be machined.

5. The process for machining a lens according to claim 1, wherein the step of holding through a suction holding force comprises activating a suction unit when the front surface rests against a Suction chamber arranged in a first rotary shaft.

6. The process for machining a lens according to claim 1, wherein the process comprises, before the step of holding through a suction holding force, the step of adapting a deformable support element to the shape of the front surface.

7. The process for machining a lens according to claim 6, wherein the step of adapting the deformable support element comprises:

resting the front surface against the deformable support element in order to give such a deformable support element a shape matching the shape of the front surface; and locking in position the support element in such a matching shape.

8. The process for machining a lens according to claim 1, wherein the step of holding through a suction holding force comprises activating a suction unit when the front surface rests against a suction chamber arranged in a first rotary shaft, and wherein the step of activating the pressure holding force comprises bringing a second rotary shaft, parallel to the first rotary shaft, to an operative position thereof in contact with the rear surface and exerting a pressure on said rear surface.

\* \* \* \* \*